UNITED STATES PATENT OFFICE.

JAMES B. HERRESHOFF, OF BRISTOL, RHODE ISLAND.

IMPROVED MODE OF TREATING FISH-WATER FOR USE IN DYEING, &c.

Specification forming part of Letters Patent No. 40,933, dated December 15, 1863.

*To all whom it may concern:*

Be it known that I, JAMES B. HERRESHOFF, of Bristol, in the county of Bristol and State of Rhode Island, have invented a new and Improved Process for Applying and Treating Menhaden-Fish Water; and I do hereby declare that the following is a full, clear, and exact description of the same.

This invention consists in the employment or use of the aqueous liquor pressed from menhaden fish during the process of extracting oil therefrom, for the purpose of precipitating tannates in the dye-tub, or as an agent for dyeing; also, in exposing the liquor thus obtained to a temperature of 300°, under pressure of sixty pounds to the square inch, for the purpose of converting its proteine compounds into bodies which form insoluble compounds with the tannic acid and render the liquid still more effective than before in the dye-tub.

To enable those skilled in the art to fully understand and carry out my invention, I will proceed to describe it.

The aqueous liquor pressed from the fish contains all the soluble salts of the fish, of which phosphate of ammonia, silicate of soda, and gelatine form a large part. The insoluble ingredient of said liquor consists of coagulated albumen and other proteine substances.

This liquor may be applied either in its natural state, or its effect may be increased by evaporating to one-tenth of its bulk under a pressure of about sixty pounds to the inch and a temperature of 300° Fahrenheit.

By the high temperature the proteine compounds of the original liquor are rendered soluble, and they are converted into bodies which form insoluble compounds with tannic acid, and at the same time, by the influence of the high temperature, the nature of the gelatine is changed, it being deprived of the property to gelatinize and made to form a less gelatinous precipitate with tannic acid.

The substances generally used in the dye-tub for precipitating tannates are glue and glue substitutes made of bone and hide scraps. These agents are objectionable on account of their cost and because they do not contain enough soluble phosphates to precipitate the iron and lime; and, furthermore, the tannate of gelatine formed in the dye-tub is so flocculent as not to precipitate, and it sticks to the cloth, making dark spots on the iron mordant.

The menhaden-fish water which I employ is much cheaper than glue or its substitutes. It contains an abundance of phosphates, and it forms a heavy precipitate with tannates, leaving no dark spots on the iron mordant.

What I claim as new, and desire to secure by Letters Patent, is—

1. The employment or use of menhaden-fish water in the dye-tub, or as an agent for dyeing, substantially in the manner specified.

2. The within-described process of treating or preparing menhaden-fish water, previous to its application in the dye-tub, by exposing it to a temperature of about 300° Fahrenheit, under a pressure of about sixty pounds to the inch, as herein set forth.

JAMES B. HERRESHOFF.

Witnesses:
JOHN TURNER,
NATH. S. GREENE.